United States Patent
Xie et al.

(10) Patent No.: US 11,692,121 B2
(45) Date of Patent: Jul. 4, 2023

(54) TERTIARY AMINE-GRAFTED SILICA NANO-PLUGGING AGENT AND WATER-BASED DRILLING FLUIDS

(71) Applicant: SOUTHWEST PETROLEUM UNIVERSITY, Chengdu (CN)

(72) Inventors: Gang Xie, Chengdu (CN); Ruolan Wang, Chengdu (CN); Jinjun Huang, Chengdu (CN); Yang Bai, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 18/053,424

(22) Filed: Nov. 8, 2022

(65) Prior Publication Data
US 2023/0080032 A1 Mar. 16, 2023

Related U.S. Application Data

(63) Continuation of application No. PCT/CN2022/100217, filed on Jun. 21, 2022.

(30) Foreign Application Priority Data

Jun. 22, 2021 (CN) .................. 202110694701.X

(51) Int. Cl.
| | |
|---|---|
| C09K 8/035 | (2006.01) |
| C09K 8/42 | (2006.01) |
| C09K 8/24 | (2006.01) |
| B82Y 30/00 | (2011.01) |
| B82Y 40/00 | (2011.01) |

(52) U.S. Cl.
CPC .............. C09K 8/426 (2013.01); C09K 8/24 (2013.01); *B82Y 30/00* (2013.01); *B82Y 40/00* (2013.01); *C09K 2208/10* (2013.01)

(58) Field of Classification Search
CPC ...... C09K 8/426; C09K 8/24; C09K 2208/10; C09K 8/03; C09K 8/035; C09K 8/5045; C09K 8/5086; C09K 8/514; C09K 8/882; C09K 8/885; C09K 8/90; B82Y 30/00; B82Y 40/00; C08F 8/30; C08F 292/00
See application file for complete search history.

(56) References Cited

U.S. PATENT DOCUMENTS

| | | |
|---|---|---|
| 2004/0229755 A1 | 11/2004 | Thaemlitz |
| 2009/0076198 A1 | 3/2009 | Giesenberg et al. |
| 2010/0317788 A1 | 12/2010 | Schutyser et al. |
| 2020/0115611 A1 | 4/2020 | Yang et al. |

FOREIGN PATENT DOCUMENTS

| | | | |
|---|---|---|---|
| CN | 103261300 | A | 8/2013 |
| CN | 103739794 | A | 4/2014 |
| CN | 104974724 | A | 10/2015 |
| CN | 105602535 | A | 5/2016 |
| CN | 105801783 | A | 7/2016 |
| CN | 105924599 | * | 7/2016 |
| CN | 105924599 | A | 9/2016 |
| CN | 108484828 | * | 4/2018 |
| CN | 108484828 | A | 9/2018 |
| CN | 108841364 | A | 11/2018 |
| CN | 110139901 | A | 8/2019 |
| CN | 110387222 | A | 10/2019 |
| CN | 110982495 | A | 4/2020 |
| CN | 111303355 | A | 6/2020 |
| CN | 111635748 | A | 9/2020 |
| CN | 111944106 | A | 11/2020 |
| CN | 112708083 | A | 4/2021 |
| CN | 113292973 | A | 8/2021 |

OTHER PUBLICATIONS

Nanjun Lai et al., CO2 capture with absorbents of tertiary amine functionized nano-SiO2, Frontiers in Chemistry, pp. 1-9.
Yanning Shu, Preparation of Nitro-organic Compounds Modified Organic-inorganic Hybrid Silica Materials for the Adsorption of Rhenium (VII), Chinese Excellent Master's Dissertation Full-text Database Engineering Science and Technology I series.

* cited by examiner

*Primary Examiner* — Kumar R Bhushan

(57) ABSTRACT

Disclosed are a high-temperature-resistant tertiary amine-grafted silica nano-plugging agent and water-based drilling fluids, relating to oil-gas field drilling. The nano-plugging agent is prepared from a hydrazine compound, a diallyl compound, an enamine compound, silica particle, and an amino-containing silane coupling agent by stepwise reaction. The nano-plugging agent has a grain size of 58-280 nm.

6 Claims, 2 Drawing Sheets

TERTIARY AMINE-GRAFTED SILICA NANO-PLUGGING AGENT AND WATER-BASED DRILLING FLUIDS

CROSS-REFERENCE TO RELATED APPLICATIONS

This application is a continuation of International Patent Application No. PCT/CN2022/100217, filed on Jun. 21, 2022, which claims the benefit of priority from Chinese Patent Application No. 202110694701.X, filed on Jun. 22, 2021. The content of the aforementioned application, including any intervening amendments thereto, is incorporated herein by reference in its entirety.

TECHNICAL FIELD

This application relates to oil-gas field drilling, and more particularly to a high-temperature-resistant tertiary amine-grafted silica nano-plugging agent and water-based drilling fluids.

BACKGROUND

Currently, the instability of the wall of the drilling well always occurs during oil-gas field drilling. According to statistics at home and abroad, shale formation accounts for 70% of the total formation, and 90% or more of the drilling well collapse occurs in the shale formation. The shale formation has special pore spaces, which are ultra-low and low-permeability, and tend to be nano-scale pore throats. Aiming at the accumulation characteristics of shale gas, horizontal well drilling has become the main drilling mode for shale gas development. Unfortunately, the collapse of the wall of the drilling well occurs either a water-based drilling fluids system or an oil-based drilling fluids system is used for drilling the shale formation, which is basically caused by a "hydraulic splitting effect". Under the hydraulic splitting effect, the drilling fluids or the filtrate entering cracks in the shale formation will expand the cracks and greatly reduce the friction force between crack interfaces, leading to a sharply increased collapse pressure. If the crack cannot be plugged to prevent the mud slurry phase from being effectively blocked to enter the cracks, the collapse of the wall of the drilling well will happen.

The sulfonated asphalt or emulsified asphalt commonly used in the drilling fluids has a particle size mostly at the micron scale, which can effectively plug the micro-scale cracks but can only be deposited on the surface of the nano-scale cracks. The particles deposited on the surface of the crack can be easily flushed by the drilling fluids, combined with the collision of the drilling tool, resulting in a discount plugging effect. Therefore, the key to maintaining the stability of the wall of the drilling well is to effectively plug nano-scale cracks in the shale formation, which is also a difficult issue that urgently needed to be solved in drilling engineering.

SUMMARY

To overcome the deficiency in the prior art that the existing plugging agent cannot effectively plug the nano-scale cracks in the shale formation to cause the instability of the wall of the drilling well, this disclosure provides a high-temperature-resistant tertiary amine-grafted silica nano-plugging agent, which can effectively plug the cracks in the shale formation to stabilize the wall of the drilling well. Moreover, this disclosure also provides novel water-based drilling fluids, which can replace the oil-based drilling fluids to solve the issues, such as the instability of the wall of the drilling well and the reservoir contamination.

The technical solutions of the disclosure are described below.

In a first aspect, the disclosure provides a tertiary amine-grafted silica nano-plugging agent, wherein the tertiary amine-grafted silica nano-plugging agent is prepared from a hydrazine compound, a diallyl compound, an enamine compound, a silica particle, and an amino-containing silane coupling agent, wherein the silica particle has a particle size of 10-20 nm;

the tertiary amine-grafted silica nano-plugging agent is prepared through steps of:

(S1) adding 0.25-0.3 mol of the silica particle into 70 mL of methylbenzene followed by heating to 50-60° C. and stirring to obtain a first solution; introducing nitrogen for 20-30 min, and heating the first solution to 80-90° C. followed by addition of the amino-containing silane coupling agent under stirring; reacting the silica particle with the amino-containing silane coupling agent for 5 h followed by vacuum distillation for 2 h to obtain a first crude product; and subjecting the crude product to rinsing with methylbenzene and filtration to remove unreacted silica particle, and vacuum drying for 2 h to obtain a modified nano-silica;

(S2) dissolving the modified nano-silica in 90-110 mL of tetrahydrofuran to obtain a second solution; adding 0.24-0.29 mol of the diallyl compound into the second solution followed by stirring at 50-60° C. for 24 h and vacuum distillation for 2 h to obtain a second crude product; and drying the second crude product under vacuum for 2 h followed by dissolving in 90-110 mL of tetrahydrofuran under stirring to obtain a third solution; introducing nitrogen for 20-30 min, and adding 0.48-0.53 mol of the hydrazine compound under stirring in the protection of nitrogen followed by heating to 30-40° C. for reaction for 8-12 h and vacuum distillation to obtain a secondary amine polymer; and (S3) dissolving the secondary amine polymer in 90-110 mL of tetrahydrofuran to obtain a fourth solution; adding 0.24-0.29 mol of the enamine compound into the fourth solution, followed by stirring at 60-68° C. for 36 h and vacuum distillation to obtain a third crude product; subjecting the third crude product to vacuum drying for 2 h to obtain a hydroxyl-containing tertiary amine polymer as the tertiary amine-grafted silica nano-plugging agent; and subjecting the tertiary amine-grafted silica nano-plugging agent to grinding and sealed storage.

In some embodiments, the amino-containing silane coupling agent is 3-aminopropyltriethoxysilane (KH550) or 3-aminopropyltrimethoxysilane (KH540).

In some embodiments, the hydrazine compound is selected from the group consisting of 2-hydroxyl benzoyl hydrazine, 3-hydroxyl benzoyl hydrazine, 4-hydroxyl benzoyl hydrazine, 4-hydroxyl phenylacetic hydrazine, 2,4-dihydroxyl benzoyl hydrazine, 3,4-dihydroxyl benzoyl hydrazine, and 3,5-dihydroxyl benzoyl hydrazine.

In some embodiments, the diallyl compound is 1,5-hexadiene, diallyamine, or N-methyl diallyamine.

In some embodiments, the enamine compound is selected from the group consisting of N-methyl-N-vinyl acetamide, N,N-diethyl-2-acrylamide, and N-vinyl-N-methyl-2-acrylamide.

In a second aspect, the present disclosure provides water-based drilling fluids containing the tertiary amine-grafted silica nano-plugging agent.

In some embodiments, the water-based drilling fluids comprise 100 parts by weight of water, 2-4 parts by weight of bentonite, 0.1-0.3 part by weight of sodium hydroxide, 0.01-0.03 part by weight of potassium polyacrylamide, 0.3-0.8 part by weight of the polyanionic cellulose, 4-6 parts by weight of the humic acid-propanesulfonic acid amide copolymer, 5-6 parts by weight of the sulfonated phenol-formaldehyde resin, 3-5 parts by weight of the amidoamine, 1-2 parts by weight of the anti-sticking filtrate loss reducer, 4-5 parts by weight of the anti-sticking lubricant, 0.3-0.5 part by weight of the emulsifier, 1-5 parts by weight of the tertiary amine-grafted silica nano-plugging agent, 1-5 parts by weight of the sulfur removal agent, 0.3-0.5 part by weight of calcium oxide, and 5-20 parts by weight of the barite.

This application has the following beneficial effects.

(1) The synthesis method is simple, and the raw materials are low-cost and easy to produce.

(2) The plugging agent provided herein is stable in performance and high in adaptability, and has high-temperature resistance and excellent plugging performance. Moreover, it has a good inhibition performance, which is greatly improved compared with similar products, so as to meet the drilling requirements of various complex well conditions.

(3) The plugging agent provided herein has a particle size of 58-280 nm, which can plug the nano-pore spaces in the shale formation, and is less likely to aggregate and thus keep a high dispersibility, thereby showing an excellent plugging performance.

DETAILED DESCRIPTION OF EMBODIMENTS

Figure 1:
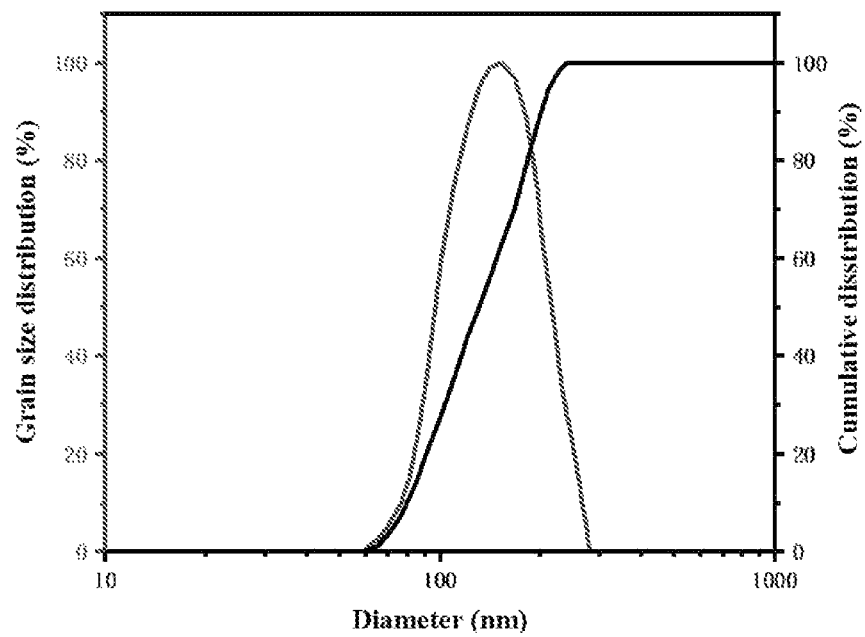
FIG. 1 schematically illustrates a grain size distribution of a tertiary amine-grafted silica nano-plugging agent according to Embodiment 1 of the present disclosure.

The technical solutions of the present application will be clearly and completely described below with reference to the embodiments. Obviously, described below are only some embodiments of the present application. Based on the embodiments provided herein, other embodiments obtained by one of ordinary skill in the art without paying any creative effort shall fall within the scope of this application.

In the following examples, the parts refer to parts by weight without special descriptions.

Preparations of a nano-plugging agent based on a tertiary amine-grafted silica are described below.

Example 1

A method of preparing a tertiary amine-grafted silica nano-plugging agent was provided, which included the following steps.

(S1) Synthesis of a Modified Silica 0.25 mol of the silica particle was added into 70 mL of methylbenzene followed by heating to 60° C. and stirring to obtain a first solution. Then nitrogen was introduced into the first solution for 30 min, followed by heating to 90° C., and addition of 3-aminopropyltriethoxysilane under stirring. The silica particle and 3-aminopropyltriethoxysilane were reacted for 5 h followed by vacuum distillation for 2 h to obtain a first crude product. After that, the first crude product was subjected to rinsing with the methylbenzene and filtration to remove unreacted silica particle, and drying under vacuum for 2 h to obtain a modified nano-silica.

(S2) Synthesis of a Secondary Amine Polymer

The modified nano-silica was dissolved in 110 mL of tetrahydrofuran to obtain a second solution. Then the second solution was added with 0.24 mol of 1,5-hexadiene followed by stirring at 60° C. for 24 h and vacuum distillation to obtain a second crude product. The second crude product was subjected to drying under vacuum for 2 h and dissolving in 110 mL of the tetrahydrofuran under stirring to obtain a third solution. The third solution was introduced with nitrogen for 30 min, and added with 0.48 mol of 2-hydroxyl benzoyl hydrazine under stirring in the protection of nitrogen followed by heating to 40° C. for reaction for 12 h and vacuum distillation to obtain a secondary amine polymer.

(S3) Synthesis of a Tertiary Amine Polymer

The secondary amine polymer was dissolved in 110 mL of tetrahydrofuran to obtain a fourth solution. Then the fourth solution was added with 0.24 mol of N-methyl-N-vinyl acetamide, followed by stirring at 68° C. for 36 h and vacuum distillation to obtain a third crude product. After that the third crude product was subjected to vacuum drying for 2 h to obtain a hydroxyl-containing tertiary amine polymer as the tertiary amine-grafted silica nano-plugging agent. Finally, the tertiary amine-grafted silica nano-plugging agent was subjected to grinding and sealed storage.

Example 2

A method of preparing a tertiary amine-grafted silica nano-plugging agent was provided, which included the following steps.

(S1) Synthesis of a Modified Silica 0.25 mol of the silica particle was added into 70 mL of methylbenzene followed by heating to 60° C. and stirring to obtain a first solution. Then the first solution was introduced with nitrogen for 30 min, followed by heating to 90° C. and addition of 3-aminopropyltriethoxysilane under stirring. The silica particle and the 3-aminopropyltriethoxysilane were reacted for 5 h followed by vacuum distillation for 2 h to obtain a first crude product. After that, the first crude product was subjected to rinsing with the methylbenzene and filtration to remove unreacted silica particle, and drying under vacuum for 2 h to obtain the modified silica.

(S2) Synthesis of a Secondary Amine Polymer

The modified nano-silica was dissolved in 110 mL of tetrahydrofuran to obtain a second solution. Then the second solution was added with 0.24 mol of diallyamine followed by stirring at 60° C. for 24 h and vacuum distillation to obtain a second crude product. The second crude product was subjected to drying under vacuum for 2 h and dissolving in 110 mL of the tetrahydrofuran under stirring to obtain a third solution. The third solution was introduced with the nitrogen for 30 min, and added with 0.48 mol of 3-hydroxyl benzoyl hydrazine under stirring in the protection of nitrogen followed by heating to 40° C. for reaction for 12 h and vacuum distillation to obtain the secondary amine polymer.

(S3) Synthesis of a Tertiary Amine Polymer

The secondary amine polymer was dissolved in 110 mL of tetrahydrofuran to obtain a fourth solution. Then the fourth solution was added with 0.24 mol of N,N-diethyl-2- acrylamide, followed by stirring at 68° C. for 36 h and vacuum distillation to obtain a third crude product. After that the third crude product was subjected to vacuum drying for 2 h to obtain a hydroxyl-containing tertiary amine polymer as the tertiary amine-grafted silica nano-plugging agent. Finally, the tertiary amine-grafted silica nano-plugging agent was subjected to grinding and sealed storage.

Example 3

A method of preparing a tertiary amine-grafted silica nano-plugging agent was provided, which included the following steps.

(S1) Synthesis of a Modified Silica 0.25 mol of the silica particle was added into 70 mL of methylbenzene followed by heating to 60° C. and stirring to obtain a first solution. Then the first solution was introduced with nitrogen for 30 min, followed by heating to 90° C. and addition of 3-aminopropyltriethoxysilane under stirring. The silica particle and the 3-aminopropyltriethoxysilane were reacted for 5 h followed by vacuum distillation for 2 h to obtain a first crude product. After that, the first crude product was subjected to rinsing with the methylbenzene and filtration to remove unreacted silica particle, and drying under vacuum for 2 h to obtain the modified silica.

(S2) Synthesis of a Secondary Amine Polymer

The modified nano-silica was dissolved in 110 mL of tetrahydrofuran to obtain a second solution. Then the second solution was added with 0.24 mol of N-methyl diallyamine followed by stirring at 60° C. for 24 h and vacuum distillation to obtain a second crude product. The second crude product was subjected to drying under vacuum for 2 h and dissolving in 110 mL of the tetrahydrofuran under stirring to obtain a third solution. The third solution was introduced with the nitrogen for 30 min, and added with 0.48 mol of 4-hydroxyl benzoyl hydrazine under stirring, in the protection of nitrogen followed by heating to 40° C. for reaction for 12 h and vacuum distillation to obtain the secondary amine polymer.

(S3) Synthesis of a Tertiary Amine Polymer

The secondary amine polymer was dissolved in 110 mL of tetrahydrofuran to obtain a fourth solution. Then the fourth solution was added with 0.24 mol of N-vinyl-N-methyl-2-acrylamide, followed by stirring at 68° C. for 36 h and vacuum distillation to obtain a third crude product. After that the third crude product was subjected to vacuum drying for 2 h to obtain a hydroxyl-containing tertiary amine polymer as the tertiary amine-grafted silica nano-plugging agent. Finally, the tertiary amine-grafted silica nano-plugging agent was subjected to grinding and sealed storage.

Example 4

A method of preparing a tertiary amine-grafted silica nano-plugging agent was provided, which included the following steps.

(S1) Synthesis of a Modified Silica 0.25 mol of the silica particle was added into 70 mL of methylbenzene followed by heating to 60° C. and stirring to obtain a first solution. Then the first solution was introduced with nitrogen for 30 min, followed by heating to 90° C., and addition of 3-aminopropyltriethoxysilane under stirring. The silica particle and the 3-aminopropyltriethoxysilane were reacted for 5 h followed by vacuum distillation for 2 h to obtain a first crude product. After that, the first crude product was subjected to rinsing with the methylbenzene and filtration to remove unreacted silica particle and drying under vacuum for 2 h to obtain the modified silica.

(S2) Synthesis of a Secondary Amine Polymer

The modified nano-silica was dissolved in 110 mL of tetrahydrofuran to obtain a second solution. Then the second solution was added with 0.24 mol of N-methyl diallyamine followed by stirring at 60° C. for 24 h and vacuum distillation to obtain a second crude product. The second crude product was subjected to drying under vacuum for 2 h and dissolving in 110 mL of the tetrahydrofuran under stirring to obtain a third solution. The third solution was introduced with the nitrogen for 30 min, and added with 0.48 mol of 3,5-dihydroxyl benzoyl hydrazine under stirring in the protection of nitrogen followed by heating to 40° C. for a reaction for 12 h and vacuum distillation to obtain the secondary amine polymer.

(S3) Synthesis of a Tertiary Amine Polymer

The secondary amine polymer was dissolved in 110 mL of tetrahydrofuran to obtain a fourth solution. Then the fourth solution was added with 0.24 mol of N-methyl-N-vinyl acetamide, followed by stirring at 68° C. for 36 h and vacuum distillation to obtain a third crude product. After that the third crude product was subjected to vacuum drying for 2 h to obtain a hydroxyl-containing tertiary amine polymer as the tertiary amine-grafted silica nano-plugging agent. Finally, the tertiary amine-grafted silica nano-plugging agent was subjected to grinding and sealed storage.

To further illustrate the effects of the tertiary amine-grafted silica nano-plugging agent provided herein, performance tests were performed on the tertiary amine-grafted silica nano-plugging agent obtained in Examples 1-4, which were described below.

Figure 2:
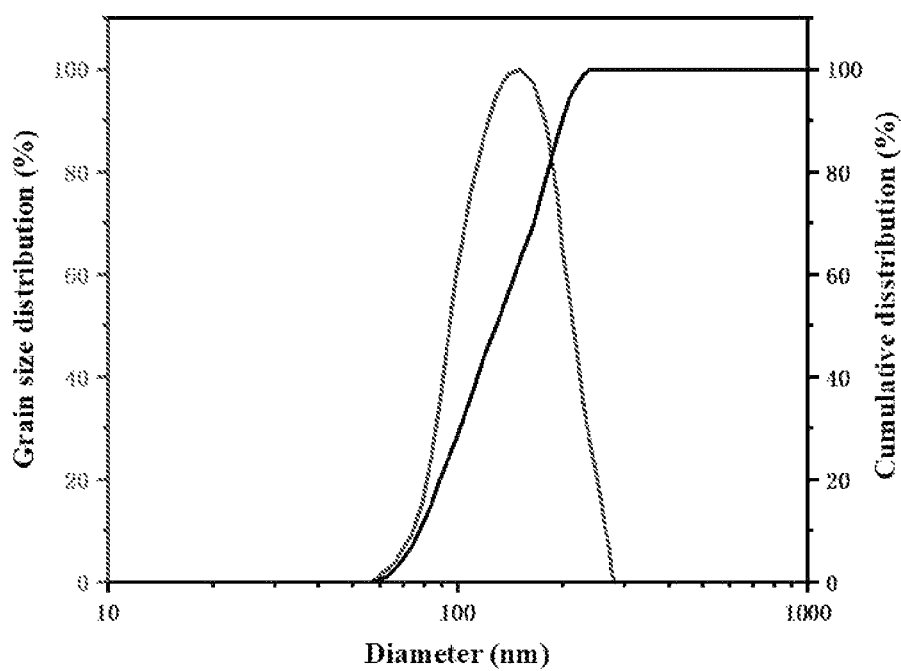
FIG. 2 schematically illustrates a grain size distribution of a tertiary amine-grafted silica nano-plugging agent according to Embodiment 2 of the present disclosure.
Figure 3:
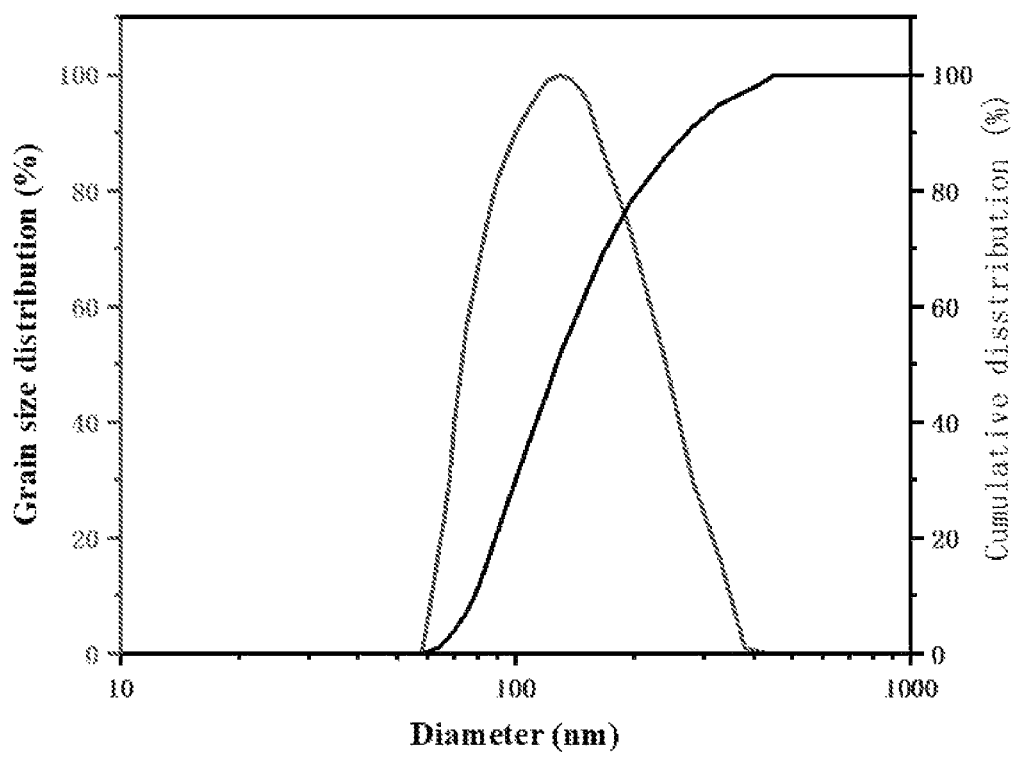
FIG. 3 schematically illustrates a grain size distribution of a tertiary amine-grafted silica nano-plugging agent according to Embodiment 3 of the present disclosure.
Figure 4:
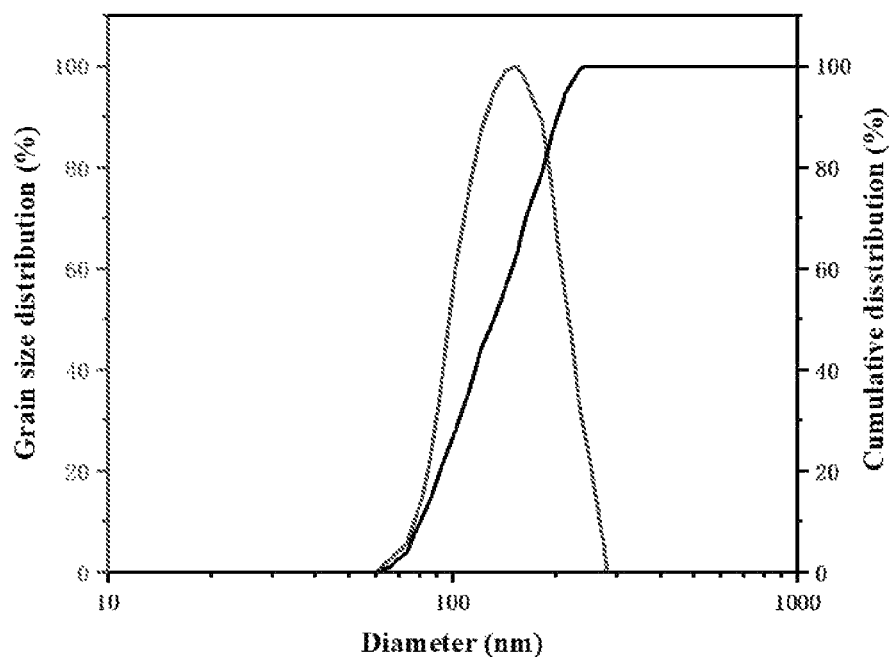
FIG. 4 schematically illustrates a grain size distribution of a tertiary amine-grafted silica nano-plugging agent according to Embodiment 4 of the present disclosure.

(1) Grain Size Detection of the Tertiary Amine-Grafted Silica Nano-Plugging Agent Grain size detections of the tertiary amine-grafted silica nano-plugging agents obtained in Examples 1-4 were performed by using a BI-200SM type laser scatterometer produced by the United States Brucker instrument company, and results were shown in FIGS. 1-4, which showed that the tertiary amine-grafted silica nano-plugging agents provided herein had a grain size of 58-280 nm and were able to plug the nano-pore spaces.

(2) Detections of Rheological and Water-Loss Wall Building Performances of Drilling Fluids The application of the tertiary amine-grafted silica nano-plugging agent was described herein. Drilling fluids were provided, which were prepared from 100 parts by weight of the water, added with 3 parts by weight of bentonite, 0.2 part by weight of sodium hydroxide, 0.02 part by weight of potassium polyacrylamide (KPAM), 0.4 part by weight of polyanionic cellulose (PAC-LV), 5 parts by weight of humic acid-propanesulfonic acid amide copolymer (RSTF), 5 parts by weight of sulfonated phenol-formaldehyde resin SMP-1, 5 parts by weight of amidoamine (FRH), 1 part by weight of anti-sticking filtrate loss reducer PPL, 4 parts by weight of anti-sticking lubricant FK-10, 0.4 part by weight of an emulsifier (SP-80), 1.2 parts by weight of a sulfur removal agent, 0.4 part by weight of calcium oxide, and 10 parts by weight of barite.

Specifically, the drilling fluids were prepared through the following steps.

(S1) Pre-Hydration of Bentonite 100 parts by weight of tap water with a temperature of 70° C. was added with 3 parts by weight of bentonite followed by stirring at room temperature, adding with 0.2 part by weight of sodium hydroxide, stirring for 30 min, sealed standing, and hydration for 24 h to obtain a pre-hydrated bentonite slurry.

(2) Preparation of the Drilling Fluids 5 parts of 400 mL of the pre-hydrated bentonite slurry were taken respectively. Each of the 5 parts of the pre-hydrated bentonite slurry was sequentially added with 0.02 part by weight of KPAM, 0.4 part by weight of PAC-LV, 5 parts by weight of RSTF, 5 parts by weight of SMP-1, 5 parts by weight of FRH, 1 part by weight of PPL, 4 parts by weight of FK-10, 0.4 part by weight of SP-80, 1.2 parts by weight of a sulfur removal agent, 0.4 part by weight of calcium oxide, and 10-20 parts by weight of barite to obtain a mixture with a density of 1.81 g/cm$^3$, where one agent was added, and the mixture was stirred for 10-15 min.

After the mixture was stirred uniformly, 5 parts of the pre-hydrated bentonite slurry were respectively added with 0, 4 g, 8 g, 12 g, and, 16 g of the tertiary amine-grafted silica nano-plugging agent prepared above to prepare the drilling fluids sample 1, the drilling fluids sample 2, the drilling fluids sample 3, the drilling fluids sample 4, and the drilling fluids sample 5, respectively, where the drilling fluids sample 1 did not contain the tertiary amine-grafted silica nano-plugging agent and was considered as a blank experiment group.

According to the national standard GB/T16783.1-2014 "Petroleum and natural gas industries-Field testing of drilling fluids-Part 1: Water-based fluids", the drilling fluids prepared above were tested rheological and water-loss wall building performances before and after aging, and the result were recorded in Table 1.

TABLE 1

Rheological and water-loss wall building performances of drilling fluids

| | After aging at 150° C. for 16 h | | | | | |
|---|---|---|---|---|---|---|
| Sample | AV | PV | YP | YP/PV | API/mL | HTHP/mL |
| Drilling fluids sample 1 | 27.50 | 20.00 | 7.50 | 0.38 | 5.30 | 6.50 |
| Drilling fluids sample 2 | 31.00 | 22.00 | 9.00 | 0.41 | 3.20 | 5.00 |
| Drilling fluids sample 3 | 35.50 | 25.00 | 10.50 | 0.42 | 2.10 | 4.00 |
| Drilling fluids sample 4 | 37.50 | 27.00 | 10.50 | 0.39 | 1.30 | 2.80 |
| Drilling fluids sample 5 | 40.00 | 29.00 | 11.00 | 0.38 | 1.20 | 2.30 |

Noted:
"AV" represents the apparent viscosity, mPa · s; "PV" represents the plastic viscosity, mPa · s; "YP" represents the yield point, Pa; "API" represent the pressure filtration loss at a normal temperature, mL; and "HTHP" represents the high-temperature and high-pressure filtration loss, mL.

It could be seen from the results shown in Table 1 that compared with the drilling fluids sample 1 (did not contain the tertiary amine-grafted silica nano-plugging agent), the performances of the drilling fluids samples 2-5 (containing 4-16 g of the tertiary amine-grafted silica nano-plugging agent) were less influenced after aging, indicating that these drilling fluids had good compatibility performance. As the addition amount of the tertiary amine-grafted silica nano-plugging agent was increased, the apparent viscosity and the plastic viscosity of the drilling fluids were gradually increased under the same experiment condition, and the influence on the tangential force was small. The high-temperature and high-pressure (HTHP) filtration loss was gradually reduced along with the increase of the addition amount of the tertiary amine-grafted silica nano-plugging agent, and the HTHP filtration loss was minimum when the addition amount of the tertiary amine-grafted silica nano-plugging agent was 16 g, which indicated that the tertiary amine-grafted silica nano-plugging agent provided herein had good rheological property and water-loss wall-building performance, effectively reduced the HTHP filtration loss of the drilling fluids, and provided a good plugging performance even in a high-temperature environment, thereby effectively preventing filtrate from entering the formation and improving the stability of the wall of the drilling well.

(3) Plugging Performance Test of Drilling Fluids

The above drilling fluids were used to prepare a mud cake with a certain size, thickness and permeability by using a GGS-71 type HTHP filtration loss instrument, which was utilized as a simulated formation with micro-cracks. The HTHP filtration loss experiment was performed on the mud cake by adding 1-5% of the tertiary amine-grafted silica nano-plugging agent provided in this application to simulate the HTHP of the tertiary amine-grafted silica nano-plugging agent in the formation, so as to calculate the penetration rate of the tertiary amine-grafted silica nano-plugging agent, thereby evaluating the plugging effect of the tertiary amine-grafted silica nano-plugging agent compared with the conventional plugging agent superfine calcium carbonate.

The plugging effect was judged according to the HTHP filtration loss, under the condition that other factors were the same, the smaller the HTHP filtration loss was smaller, the smaller the permeability rate of the drilling fluids in the formation was, the harder the drilling fluids were immersed into the formation, and the better the plugging effect was.

The mud cake was prepared through the following steps.

(S1) 5000 mL of purified water with a temperature of 70° C. was added with 300 g of bentonite under stirring at 1000 r/min by using a stirring instrument, then added with 40 g of anhydrous sodium carbonate followed by stirring at 800 r/min for 3 h, and pre-hydration for 24 h to obtain a slurry.

(S2) 5000 mL of the slurry was sequentially added with 0.02 part by weight of KPAM, 0.4 part by weight of PAC-LV, 5 parts by weight of RSTF, 5 parts by weight of SMP-1, 5 parts by weight of FRH, 1 part by weight of PPL, 4 parts by weight of FK-10, 0.4 part by weight of SP-80, 1.2 parts by weight of a sulfur removal agent, and 0.4 part by weight of calcium oxide, followed by stirring at 1400 r/min for 3 h and aging in a thermal roller at 150° C. for 16 h.

(S3) The aged drilling fluids were slowly poured with a glass rod into an HTHP filtration loss instrument to undergo the HTHP filtration loss instrument at 150° C. and 3.5 MPa for 30 min to obtain precipitation. The precipitation was taken out from the HTHP filtration loss instrument and rinsed with 50° C. water to obtain the mud cake.

The plugging performances of the tertiary amine-grafted silica nano-plugging agent provided herein were evaluated as follows.

Mud cakes were prepared according to the above method. Mud cakes with similar penetration rates were selected and put into the HTHP filtration loss instrument. Several 100 mL of solutions containing different amounts of the nano-plugging agent were prepared, and subjected to ultrasonic dispersion for 10 min and respectively transferred into the HTHP filtration loss instrument for detection at 150° C. and 3.5 MPa for 30 min, where the readings were recorded every 5 min. After detection, the mud cake was taken out and dried by using a dryer to obtain the permeability rates of the mud cake with different loading of the tertiary amine-grafted silica nano-plugging agent, and the results were shown in Table 2.

TABLE 2

Evaluation of plugging effect under different addition amounts of the tertiary amine-grafted silica nano plugging agent

| Addition amounts of the tertiary amine-grafted silica nano plugging agent | Thickness of the mud cake/mm | Water loss/mL | Permeability rates of the mud cake/$10^{-3}$ mD | Plugging rate/% |
|---|---|---|---|---|
| 0% | 4.10 | 9.81 | 1.07 | — |
| 0.5% | 4.20 | 6.57 | 0.74 | 31.02 |
| 1.0% | 4.30 | 5.58 | 0.64 | 40.07 |
| 1.5% | 4.50 | 5.04 | 0.60 | 44.01 |
| 2.0% | 3.90 | 4.23 | 0.44 | 59.23 |
| 2.5% | 3.90 | 3.96 | 0.42 | 61.17 |
| 3.0% | 4.60 | 2.61 | 0.32 | 70.23 |
| 3.5% | 4.00 | 2.79 | 0.30 | 72.12 |
| 4.0% | 4.20 | 2.52 | 0.28 | 73.87 |
| 4.5% | 4.40 | 2.34 | 0.27 | 74.81 |
| 5.0% | 4.30 | 2.07 | 0.24 | 77.52 |

It could be seen from Table 2 that the tertiary amine-grafted silica nano-plugging agent provided herein had excellent plugging performance. The average water loss and the permeability rate of the mud cake calculated by the HTHP water loss experiment by using the tertiary amine-grafted silica nano-plugging agent were much smaller than using the clear water. Moreover, the plugging effect was improved along with the increase of the addition amount of the tertiary amine-grafted silica nano plugging agent, and the maximum plugging rate could reach 77.52%. Therefore, the tertiary amine-grafted silica nano-plugging agent provided in this application could plug the nano-pore spaces.

In conclusion, the method of preparing the tertiary amine-grafted silica nano-plugging agent was stable and reliable. Moreover, the raw materials used herein were low-cost, and the prepared polymer plugging agent was good in plugging, rheological properties, water solubility, dispersibility, and adsorption performance, which was superior to similar products. Besides, the tertiary amine-grafted silica nano-plugging agent provided herein can well stabilize the wall of the drilling well, achieve an excellent plugging effect only in a small amount, and is an effective way of solving the instability of the well wall and the drilling fluids leakage.

The above-mentioned embodiments are merely illustrative of the technical solutions of the present disclosure, and are not intended to limit the present disclosure. Although the present disclosure has been described in detail with reference to the embodiments, it should be understood that some modifications and equivalent replacements can still be made by one of ordinary skill in the art to the technical solutions provided herein. Those modifications or replacements made by those skilled in the art without departing from the spirit and scope of the disclosure shall fall within the scope of the disclosure defined by the appended claims.

What is claimed is:

1. A tertiary amine-grafted silica nano-plugging agent, wherein the tertiary amine-grafted silica nano-plugging agent is prepared from a hydrazine compound, a diallyl compound, an enamine compound, a silica particle, and an amino-containing silane coupling agent, wherein the silica particle has a particle size of 10-20 nm;
the tertiary amine-grafted silica nano-plugging agent is prepared through steps of:

(S1) adding 0.25-0.3 mol of the silica particle into 70 mL of methylbenzene followed by heating to 50-60° C. and stirring to obtain a first solution; introducing nitrogen for 20-30 min, and heating the first solution to 80-90° C. followed by addition of the amino-containing silane coupling agent under stirring; reacting the silica particle with the amino-containing silane coupling agent for 5 h followed by vacuum distillation for 2 h to obtain a first crude product; and subjecting the crude product to rinsing with methylbenzene and filtration to remove unreacted silica particle, and vacuum drying for 2 h to obtain a modified nano-silica;

(S2) dissolving the modified nano-silica in 90-110 mL of tetrahydrofuran to obtain a second solution; adding 0.24-0.29 mol of the diallyl compound into the second solution followed by stirring at 50-60° C. for 24 h and vacuum distillation for 2 h to obtain a second crude product; and drying the second crude product under vacuum for 2 h followed by dissolving in 90-110 mL of tetrahydrofuran under stirring to obtain a third solution; introducing nitrogen for 20-30 min, and adding 0.48-0.53 mol of the hydrazine compound under stirring in the protection of nitrogen followed by heating to 30-40° C. for reaction for 8-12 h and vacuum distillation to obtain a secondary amine polymer; and (S3) dissolving the secondary amine polymer in 90-110 mL of tetrahydrofuran to obtain a fourth solution; adding 0.24-0.29 mol of the enamine compound into the fourth solution, followed by stirring at 60-68° C. for 36 h and vacuum distillation to obtain a third crude product; subjecting the third crude product to vacuum drying for 2 h to obtain a hydroxyl-containing tertiary amine polymer as the tertiary amine-grafted silica nano-plugging agent; and subjecting the tertiary amine-grafted silica nano-plugging agent to grinding and sealed storage; and the hydrazine compound is selected from the group consisting of 2-hydroxyl benzoyl hydrazine, 3-hydroxyl benzoyl hydrazine, 4-hydroxyl benzoyl hydrazine, 4-hydroxyl phenylacetic hydrazine, 2,4-dihydroxyl benzoyl hydrazine, 3,4-dihydroxyl benzoyl hydrazine, and 3,5-dihydroxyl benzoyl hydrazine; and the enamine compound is selected from the group consisting of N-methyl-N-vinyl acetamide, N,N-diethyl-2-acrylamide, and N-vinyl-N-methyl-2-acrylamide.

2. The tertiary amine-grafted silica nano-plugging agent of claim 1, wherein the amino-containing silane coupling agent is 3-aminopropyltriethoxysilane or 3-aminopropyltrimethoxysilane.

3. The tertiary amine-grafted silica nano-plugging agent of claim 1, wherein the diallyl compound is 1,5-hexadiene, diallyamine, or N-methyl diallyamine.

4. Water-based drilling fluids, comprising:
the tertiary amine-grafted silica nano-plugging agent of claim 1.

5. The water-based drilling fluids of claim 4, wherein the water-based drilling fluids further comprise water, bentonite, sodium hydroxide, potassium polyacrylamide, polyanionic cellulose, humic acid-propanesulfonic acid amide copolymer, a sulfonated phenol-formaldehyde resin, an amidoamine, an anti-sticking filtrate loss reducer, an anti-sticking lubricant, an emulsifier, a sulfur removal agent, calcium oxide, and barite.

6. The water-based drilling fluids of claim 5, wherein the water-based drilling fluids comprise 100 parts by weight of water, 2-4 parts by weight of bentonite, 0.1-0.3 part by weight of sodium hydroxide, 0.01-0.03 part by weight of potassium polyacrylamide, 0.3-0.8 part by weight of the polyanionic cellulose, 4-6 parts by weight of the humic acid-propanesulfonic acid amide copolymer, 5-6 parts by weight of the sulfonated phenol-formaldehyde resin, 3-5 parts by weight of the amidoamine, 1-2 parts by weight of the anti-sticking filtrate loss reducer, 4-5 parts by weight of the anti-sticking lubricant, 0.3-0.5 part by weight of the emulsifier, 1-5 parts by weight of the tertiary amine-grafted silica nano-plugging agent, 1-5 parts by weight of the sulfur removal agent, 0.3-0.5 part by weight of calcium oxide, and 5-20 parts by weight of the barite.

\* \* \* \* \*